United States Patent [19]
Battista

[15] 3,639,266
[45] Feb. 1, 1972

[54] CARBONIZATION OF COMPRESSED CELLULOSE CRYSTALLITE AGGREGATES

[72] Inventor: Orlando A. Battista, Yardley, Pa.
[73] Assignee: FMC Corporation, Philadelphia, Pa.
[22] Filed: Apr. 8, 1968
[21] Appl. No.: 719,717

Related U.S. Application Data

[63] Continuation-in-part of Ser. No. 435,744, Feb. 26, 1965, abandoned.

[52] U.S. Cl. ...................252/421, 23/209.2, 23/209.4, 252/445, 264/29
[51] Int. Cl. ......................................................C01b 31/08
[58] Field of Search ..........................23/209.2, 209.4, 209.1; 252/421, 444, 445; 264/29

[56] References Cited

UNITED STATES PATENTS

| | | | |
|---|---|---|---|
| 2,362,463 | 11/1944 | Boehm et al. | 23/209.2 X |
| 2,978,446 | 4/1961 | Battista | 260/212 |
| 3,104,159 | 9/1963 | Davidson | 23/209.1 |
| 3,358,058 | 12/1967 | Losty | 264/29 |

*Primary Examiner*—Edward J. Meros
*Attorney*—Thomas R. O'Malley and George F. Mueller

[57] ABSTRACT

Shaped, pure carbon structures are formed by compacting a binderless mass of cellulose crystallite aggregates to solidify the mass and heating the solidified mass to a carbonizing temperature in an oxygen-free atmosphere. The structure may be activated by heating in steam or carbon dioxide.

5 Claims, No Drawings

CARBONIZATION OF COMPRESSED CELLULOSE CRYSTALLITE AGGREGATES

This application is a continuation-in-part of my copending application Ser. No. 435,744, filed Feb. 26, 1965, now abandoned. This invention relates to an improved active carbon and method for preparing the same.

Charcoals containing high amounts of carbon and having a high-adsorptive capacity are desired for industrial use. The usual method of obtaining high-carbon content, highly adsorbent charcoals is through the destructive distillation and activation of wood. The product from this process is generally irregularly shaped pieces which are subject to dusting and flaking. The activation step is usually necessary to produce a charcoal with satisfactory adsorptive power.

Prior activated carbon structures when formed from particulate cellulosic materials, such as wood flour or fibers, necessitated the use of either a natural binder such as lignins and resins in wood or other binders. The presence of these binders was essential to prevent swelling on drying and crumbling of the structure during carbonization. The presence of the binders, however, necessitated an additional heating step, namely, a careful and prolonged roasting period so as to decompose the binder and free the structure of the binder and permit subsequent activation of the carbon.

It is an object of this invention to provide an active carbon having high-adsorptive capacity both in the high-pore radii range and the low-pore radii range.

It is another object of this invention to provide a low-dusting, uniformly shaped active carbon mass having a high-carbon content and a high-adsorptive capacity.

It is a further object of this invention to provide a method for preparing an active carbon article of manufacture having a high-adsorptive capacity.

These and other objects are achieved in accordance with this invention which broadly includes a method of forming a uniformly shaped pure carbon article which comprises compacting a binderless mass of cellulose crystallite aggregates under a pressure of at least 1,000 p.s.i. to solidify the mass, and heating said mass to a carbonizing temperature under reducing conditions. In a preferred embodiment, the carbonized mass if further activated by heating it at an elevated temperature of at lest 600° C. with an inert gas such as steam or carbon dioxide. This invention also includes an article of manufacture comprising active carbon having pure carbon content of at least about 95 percent, a total pore volume in the pore radii range of 100 to 6300 A. of from 1.5 to 2.5 milliliters per gram. A preferred active carbon according to this invention also has a total pore volume in the pore radii range of less than 10 A. of at least 0.2 and preferably at lest 0.4 milliliters per gram.

The active carbon of this invention is produced from compacted microcrystalline cellulose or cellulose crystallite aggregates having a level-off degree of polymerization. These small crystallite aggregates, their properties, and a method of disintegration are described in U.S. Pat. No. 2,978,446 issued Apr. 4, 1961. They are acid-insoluble products produced by the controlled acid hydrolysis of cellulose and the level-off D.P. value reflects a destruction of the original fibrous structure of the cellulosic source material. The term "level-off D.P." has reference to the average level-off degree of polymerization of the cellulose product measured in accordance with the paper O.A. Battista entitled "Hydrolysis and Crystallization of Cellulose," Vol. 42, INDUSTRIAL AND ENGINEERING CHEMISTRY, Pages 502–7 (1950).

As described in the foregoing patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5 percent) hydrochloric acid solution at 121° C. under pressure for 1 hour. In accordance with the method as described in the patent, the insoluble residue is preferably washed free of acid.

The cellulose crystallite aggregates which are recovered from the hydrolysis treatment have a particle size in the range of less than 1 micron to about 375 microns, depending on the cellulose source, as determined visibly by microscopic examination and may be designated as "as-formed cellulose crystallite aggregates."

The source material for the cellulose crystallite aggregates may be any of the natural cellulose materials, such as natural fibers, for example, ramie, cotton, purified cotton, purified wood pulps such as bleached sulfite pulp, bleached sulfate pulp, etc., or regenerated forms of cellulose for example, rayon, cellophane, etc., and in all instances has an actual D.P. greater than its average level-off D.P. The aggregates may have an average level-off D.P. value in the range of from about 15 to about 375 and the specific value will be dependent upon the source material. Aggregates having an average level-off D.P. in the range of 15 to 60, for example, are produced from regenerated forms of cellulose. Aggregates having an average level-off D.P. in the range of 60 to 125 may be obtained from alkali swollen natural forms of cellulose such as cotton linters and purified wood pulps. Sulfite pulp as a source material will produce cellulose crystallite aggregates having an average level-off D.P. in the range of 200 300. Although the cellulose chains in the crystallites are uniform in length by comparison with the source material, some variation occurs, and, for this reason, the D.P. is referred to as an average level-off D.P. value.

As obtained from the acid hydrolysis and water washing steps, the aggregates in the overall average level-off D.P. range of 15 to 375 are in a loosely aggregated state and, particularly in the larger sizes, say from 40 to 250 or 375 microns, are characterized by the presence of many cracks in their surfaces, including similar surface irregularities or phenomena like pores, depressions, voids, fissures and notches. Because of such irregularities, the apparent or bulk density of the aggregates is much less than their absolute density. Furthermore, the cracks and other irregularities persist despite the application of high-compressive forces on the aggregates. Thus, when they are compressed at 5,000 p.s.i. they exhibit an apparent specific gravity of 1.26; at 10,000 p.s.i. the apparent specific gravity rises to 1.32; at 15,000 p.s.i. it is 1.34; and at 25,000 and 37,000 p.s.i. it is 1.38 and 1.38, respectively. On the other hand, the absolute specific gravity of a unit crystal or crystallite is 1.55 to 1.57, from which it is apparent that the aggregates occlude considerable quantities of air in the surface cracks, voids, fissures, etc. The apparent specific gravity of the dried disintegrated aggregates at the compressive forces noted, are somewhat higher than the foregoing values.

If desired mechanical disintegration of the aggregates may be carried out in several ways, as by subjecting them to attrition in a mill, or to a high-speed cutting action, or they may be forced through a multiplicity of fine holes so that they are subjected to an attriting or shearing action by entrance and passage through the openings as well as to the attriting action by virtue of being rubbed against each other under the influence of applied force. The disintegration of the aggregates is preferably carried out in the presence of an aqueous medium.

The attrited or nonattrited crystallite aggregates are usually dried for storage and handling after preparation. The drying is suitably carried out by a number of drying procedures including, for example, spray drying, freeze drying, drum drying and drying by solvent displacement. Some of these drying procedures advantageously produce lower bulk density materials. Spray drying, for example, wherein the wet aggregates are sprayed into hot, dry air, produces a material having a considerably higher surface area as compared to the same weight of material dried by standing in air or in an oven. Furthermore, it has been observed that the combination of mechanical attrition, preferably in an aqueous medium, and spray drying of the cellulose crystallite aggregates produces a more porous material preferred for the manufacture of active carbon.

As described hereinafter, the product forming step is carried out by using pressure, and it may be noted that some disintegration or attrition of the aggregates also may take place during the step of compressing them. In fact, the greater the pressure, the more particles will be obtained having a smaller size. At the same time, compression has the effect of orienting, or lining up, the smaller particles so that the faces of these latter aggregates are brought so closely together that the aggregates are held by intermolecular bonding forces, and a larger structure is formed. The density of such larger structure, or compressed shape, tends to approach the density of the crystallite aggregates. To facilitate the foregoing actions, and to increase the particle to particle contact, the compression of the aggregates may be carried out in a vacuum of any suitable magnitude.

Preferably, the shaped product is formed by compressing dry crystallite aggregates, which contain about 6 percent moisture, into the desired shape. No added moisture is necessary to produce hard, stable products.

Generally, the forming step is accomplished at room temperature by applying elevated pressure of at least 1,000 p.s.i. and up. Pressures of 5,000 to 30,000 p.s.i. are preferred for the formation of some products while pressures of 100,000 p.s.i. and higher are useful. As the forming pressure increases, the density and hardness of the resulting product increases, and it progressively becomes more insensitive to moisture.

Drying of the shaped product prior to carbonizing may be carried out at temperatures ranging from room to about 100° C. Drying conditions which tend to produce steam should be avoided.

A number of more or less specific procedures are available for making the product.

Another forming procedure comprises subjecting the wet or never-dried aggregates, having any desirable particle size and size distribution, to compression, preferably under conditions permitting the escape of water, and then drying the pressed product, there being obtained a hornified material having a very smooth, glossy surface.

Generally, the wet aggregates may be compressed at lower pressures than the dried to achieve a comparable bonding effect in the product. Also, pressing may be done at higher temperatures if desired, say room to 100° to 150° C., or more, to favor hydrogen bonding, but is conveniently performed at room temperatures. The aggregates do not flow under the influence of pressure.

While the foregoing procedures provide products having a gradation of properties, all products have several common features. Thus, all are unitary three-dimensional materials. All comprise attrited and dried aggregates. In all of them, the cellulose particles, because of the purity of the crystallites and the forcing into close association by means of pressure or surface tension, of the free hydroxyl groups on their surfaces, are considered to be interfacially bonded.

Any suitable carbonizing process may be used to produce the active carbon of this invention. The usual procedure is to place the compacted microcrystalline cellulose in an electrically heated furnace and heat to carbonizing temperatures, e.g., 400° C. and up under reducing conditions. In the preferred heating procedure, the compacted material is brought slowly into the carbonizing range and heated up to 700°–800° C. In general, reducing conditions include carrying out the heating under nitrogen gas or in the absence of air or other free-oxygen containing gas. The carbonizing process produces an activated charcoal without the usual activation treatment, however, an improved active carbon is produced by treating the char in conventional activating process. Activation is usually accomplished by heating the carbonized mass to elevated temperatures (600°–1,000° C.) with steam or carbon dioxide to form a more porous structure.

The following examples are set forth to demonstrate the products and methods of this invention.

EXAMPLE I

Cellulose crystallite aggregates having an average level-off degree of polymerization of about 220 and mechanically attrited and spray dried to produce an average particle size of about 38 microns were compacted to tablets (about three-eighths of an inch in diameter and one-eighth of an inch in thickness) under a pressure of about 5,000 p.s.i. in a conventional tablet making machine. These tablets were first completely dried and then carbonized and steam activated using conventional techniques. The tablets, although shrunken appreciably, retained their shapes remarkably well, no fines were produced and the char tables possessed a skin which appeared harder than the interior. The carbon content of the char tablet was about 97 percent and only a very small amount, about 0.2 percent, of ash was produced. The bulk density of the char tablet was about 0.30 percent gms./ml.

A summary of surface properties of the activated carbon tablet, unactivated carbon tablet, the original cellulose tablet and a commercially available activated charcoal is given in the following table.

TABLE I

| Properties | Samples | | | |
|---|---|---|---|---|
| | Activated carbon tablet | Unactivated carbon tablet | Original cellulose tablet | Commercial activated charcoal |
| Surface and pore data: | | | | |
| Surface area, m.²/g | 1,475 | | | 443 |
| Particle volume, ml./g | 2.824 | 1.606 | 1.171 | 1.220 |
| Total pore volume, ml./g | 2.340 | 1.100 | 0.534 | 0.754 |
| Pore volume distribution, ml./g., pore radii: | | | | |
| 100–63,000 A | 1.670 | 0.885 | 0.536 | 0.494 |
| Less than 100 A | 0.670 | 0.215 | 0.00 | 0.260 |
| Less than 10 A | 0.454 | | | 0.071 |

Of significance in the above table is the large surface area and pore volume of the active carbon tablet of this invention. In addition, high-pore volume in the upper pore radii range as well as a comparatively high-pore volume in the low-pore radii range (micropores) is surprising and significant. This material is useful for adsorption purposes for both macromolecular and micromolecular materials as verified by chemical adsorption tests.

EXAMPLE II

Cellulose crystallite aggregates having an average level-off degree of polymerization of about 220 and mechanically attrited and spray dried to produce an average particle size of above 19 microns were compacted to tablets (about three-eighths of an inch in diameter and one-eighth of an inch in thickness) under a pressure of about 5,000 p.s.i. These tablets were first dried and then carbonized and steam activated using conventional techniques. After pyrolysis the tablets appeared much the same as those of example I. No fines were produced and the carbonized tablet had a hard skin which helped prevent flaking or dusting. The char tablet contained a small amount of ash, about 0.5 percent, and had a bulk density of about 0.22 gms./ml. The carbon content found in this sample was 96 percent.

A summary of surface properties of the activated carbon table, unactivated carbon tablet, the original cellulose crystallite tablet and a commercially available activated charcoal is set forth in the following table.

TABLE II

| Properties | Samples | | | |
|---|---|---|---|---|
| | Activated carbon tablet | Unactivated carbon tablet | Original cellulose tablet | Commercial activated charcoal |
| Surface and pore data: | | | | |
| Surface area, m.²/g | 1,114 | | | 443 |
| Particle volume, ml./g | 3.087 | 1.938 | 1.311 | 1.220 |
| Total pore volume, ml./g | 2.595 | 1.432 | 0.674 | 0.754 |
| Pore volume distribution, ml./g., pore radii: | | | | |
| 100–63,000 A | 2.092 | 1.238 | 0.712 | 0.494 |
| Less than 100 A | 0.503 | 0.194 | 0.00 | 0.260 |
| Less than 10 A | 0.267 | | | 0.071 |

As in example I, the large surface area and pore volume of the activated carbon is of significance. Further, the comparatively high-pore volume in the upper pore radii range as well as that in the low-pore radii range provides an unexpectedly useful adsorbent material.

The product of this invention are primarily useful as adsorbents for liquids and gases of both the macromolecular and micromolecular consistency. However, it is also contemplated that the shaped pure carbon article is useful for other purposes including, for example, as insulating material for both temperature and electrical applications.

The method of this invention produces an unusually strong, low-dusting, pure carbon article. These articles are unique because of their strength, pore network, high porosity and variety of adsorptive efficiency.

Various changes and modifications may be made practicing the invention without departing from the spirit and scope thereof and, therefore, the invention is not to be limited except as defined in the appended claims.

I claim:

1. A method for preparing a shaped, pure carbon structure which comprises compacting a binderless mass consisting essentially of cellulose crystallite aggregates having an average level off D.P. produced by the controlled hydrolysis of cellulose, said compacting carried out under a pressure of at least 1,000 p.s.i. to solidify the mass, heating the solidified mass to a carbonizing temperature in an oxygen free atmosphere and recovering a shaped carbon structure.

2. The method of claim 1 wherein the cellulose crystallite aggregates have been mechanically attrited.

3. the method of claim 2 wherein the attrited cellulose crystallite aggregates have been spray dried.

4. The method of claim 1 wherein the recovered shaped, carbon structure is further treated by heating in an atmosphere of steam or carbon dioxide to a temperature of at least 600° C.

5. The method of claim 4 wherein the heating of the recovered shaped, carbon structure is effected in an atmosphere of steam.

* * * * *

UNITED STATES PATENT OFFICE
CERTIFICATE OF CORRECTION

Patent No. 3,639,266      Dated 2/1/72

Inventor(s) Orlando A. Battista

It is certified that error appears in the above-identified patent and that said Letters Patent are hereby corrected as shown below:

Col. 1, line 18, "added" should be inserted after -- other --; line 41, "if" should read -- is --; line 50, "lest" should read -- least --. Col. 2, line 27, "200 300" should read -- 200 to 300 --. Col. 4, line 12, "tables" should read -- tablets --; line 16, "percent" should be deleted; lines 58 and 59 "table" should read -- tablet --. Col. 5, line 6, "product" should read -- products --.

Signed and sealed this 27th day of June 1972.

(SEAL)
Attest:

EDWARD M. FLETCHER, JR.
Attesting Officer

ROBERT GOTTSCHALK
Commissioner of Patents